United States Patent
Martel et al.

[15] 3,694,472
[45] Sept. 26, 1972

[54] SYNTHESIS OF PYRETHRIC ACID

[72] Inventors: Jacques Martel, Bondy; Jean Buendia, Fontenay-Sous-Bois, both of France

[73] Assignee: Roussel-Uclaf, Paris, France

[22] Filed: May 12, 1970

[21] Appl. No.: 36,675

[52] U.S. Cl. ..........................260/468 P, 260/514 P
[51] Int. Cl. ..................................................C07c 69/74
[58] Field of Search ......................260/468 P, 514 P

[56] References Cited

OTHER PUBLICATIONS

March, Advanced Organic Chemistry, pp. 696– 697 (1968).

Primary Examiner—Lorraine A. Weinberger
Assistant Examiner—Robert Gerstl
Attorney—Hammond & Littell

[57] ABSTRACT

A novel process for the preparation of 3,3-dimethyl-2-(2'-methoxycarbonyl-trans 1'-propenyl)-1-cyclopropane carboxylic (1R,2R) acid or d-trans pyrethric (1R,2R) acid of the formula

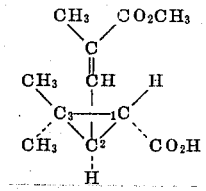

by reacting 3,3-dimethyl-2-formyl-1-cyclopropanecarboxylic (1R,2R) acid or a salt thereof with methyl propionate under anhydrous basic conditions.

5 Claims, No Drawings

SYNTHESIS OF PYRETHRIC ACID

STATE OF THE ART

The hemisynthesis of d-trans pyrethric (1R,2R) acid is of great industrial interest because the acid is constituent of natural pyrethrins as well as very insecticidally active synthetic pyrethric acid esters such as the (5-benzyl-3-furyl) methyl alcohol ester of d-trans pyrethric acid. However, this hemisynthesis is difficult to carry out. Matsui et al. [Agr. Biol. Chem. Jap., Vol 27, p. 373 (1963)] have described a long and sensitive process for the preparation of d-trans pyrethric acid requiring five stages and beginning with d-trans chrysanthemic acid. Another process is describe in Dutch application Ser. No. 68 15987 filed Nov. 8, 1968, consisting of reacting 3,3-dimethyl-2-formyl-1-cyclopropanecarboxylic (1R,2R) acid with phosphonates or phosphoranes, which reagents are relatively difficult to prepare, to form d-trans pyrethric acid.

OBJECTS OF THE INVENTION

It is an object of the invention to provide a novel process for the preparation of d-trans pyrethric acid beginning with 3,3-dimethyl-2-formyl-1-cyclopropanecarboxylic (1R,2R) acid or a salt thereof with an inexpensive reagent, namely methyl propionate.

This and other objects and advantages of the invention will become obvious from the following detailed description.

THE INVENTION

The novel process of the invention for the preparation of d-trans pyrethric acid comprises reacting in an anhydrous basic medium 3,3-dimethyl-2-formyl-1-cyclopropanecarboxylic (1R,2R) acid or a salt thereof with methyl propionate to form d-trans pyrethric (1R,2R) acid.

Examples of suitable basic agents for the condensation are alkali metal hydrides such as sodium hydride, alkali metal alcoholates such as sodium methylate, sodium ethylate or potassium tert.-butylate; or alkali metal amides such as sodium amide. The basic agents are preferably admixed with a very small amount of anhydrous lower alkanols such as methanol, ethanol or isopropanol. The preferred basic system is sodium hydride in methanol.

The said condensation is preferably effected in the presence of a solvent which may be excess methyl propionate or one or more organic solvents such as dimethoxyethane, tetrahydrofuran, methanol or ethanol.

To effect condensation of methyl propionate with the said acid with an excess of the basic agent, the methyl propionate and acid are mixed either in the presence of excess methyl propionate or in the presence of one or more organic solvents. However, before reacting the methyl propionate, the methylpropionate is preferably treated with a basic agent to partially convert it into its anionic (enolic or carbanionic) form.

The preferred method of the invention consists of reacting an alkali metal salt, i.e., sodium, with methyl propionate previously treated with a basic agent so it is partially converted into its anionic form.

The alkali metal salts of 3,3-dimethyl-2-formyl-1-cyclopropanecarboxylic (1R, 2R) acid is obtained by reacting stoichiometric amounts of the free acid and an alkali metal alcoholate or alkali metal hydroxide in the presence of an organic solvent such as ethanol. The organic solvent can be removed by distillation and entrainment with a solvent such as benzene.

To convert the methyl propionate to its anionic form, methyl propionate can be treated with a hot basic agent such as an alkali metal hydride, alkali metal alcoholate or an alkali metal amide admixed with a very small amount of an anhydrous lower alkanol. The preferred basic agent is sodium hydride with anhydrous methanol.

The crude d-trans pyrethric acid can be purified in a suitable fashion. For example, the product can be treated with reagent T (trimethylaminoacetohydrazide chloride) to eliminate any aldehyde fractions and then converting the free acid into a salt such as an alkali metal salt, 1-quinine salt or L(+) or D(−) 1-p-nitrophenyl-2-N,N-dimethylamino propane-1,3-diol salts, purifying the salt by recrystallization and acidifying the salt to regenerate d-trans pyrethric acid.

Preparation of the starting material, trans-3,3-dimethyl-2-formyl-1-cyclopropanecarboxylic (1R,2R) acid, is described in French Pat. No. 1,580,475 or by reacting d-trans chrysanthemic acid with ozone as described by Yamamoto (Scient. Papers. Inst. Phys. Chem. Res. Vol. 3 (1925), p. 193–222) for the racemic acid or by saponification of its methyl ester prepared by reacting in a methanol medium ozone and the methyl ester of d-trans-chrysanthemic acid followed by reducing the oxidation product with di-methyl sulfide and then acid treatment.

In the following examples there are described several preferred embodiments to illustrate the invention. However, it should be understood that the invention is not intended to be limited to the specific embodiments.

EXAMPLE I

Preparation of 3,3-dimethyl-2-(2'-methoxycarbonyl-trans-1'-propenyl)-1-cyclopropanecarboxylic (1R,2R) acid Step A: Methyl ester of trans 3,3-dimethyl-2-formyl-1-cyclopropanecarboxylic (1R,2R) acid.

one-hundred and six gm of the methyl ester of d-trans chrysanthemic acid (which can be obtained by esterification of d-trans chrysanthemic acid prepared by hydrolysis of natural pyrethrins or resolution of synthetically produced dl-trans chrysanthemic acid) were added to 750 cc of methanol and after cooling the resulting solution to −60° C while bubbling oxygen therein, ozonized oxygen was then bubbled therethrough until the reaction medium turned blue (about 8 hours). Ozonized oxygen was bubbled therethrough for an additional 30 minutes followed by oxygen and then nitrogen. The temperature of the reaction mixture was then raised to −40°C and 120 cc of dimethyl sulfide were added thereto under a nitrogen atmosphere. The reaction mixture was then returned to room temperature and stirred for 15 hours at the said temperature. The mixture was then distilled to dryness under reduced pressure and the residue was dissolved in methylene chloride. The methylene chloride solution was washed with an aqueous solution of sodium bicarbonate, dried and concentrated to dryness under reduced pressure. The resulting residue was added under a nitrogen atmosphere to 850 cc of an aqueous solution of 30 percent acetic acid and the reaction mixture was heated to 80° C and held there for 15 minutes. It was cooled, extracted with ethyl ether and the combined ethyl ether extracts were washed with an aqueous solution of sodium bicarbonate then with an aqueous solution of sodium chloride, were dried and concentrated to dryness by distillation under reduced pressure to obtain 85 gm of the methyl ester of trans 3,3-dimethyl-2-formyl-1-cyclopropanecarboxylic (1R,2R) acid having a boiling point of 89° C at 11 mm Hg. Its 2,4-dinitrophenylhydrazone derivative melted at 175° C.

Step B: Trans 3,3-dimethyl-2-formyl-1-cyclopropanecarboxylic (1R,2R) acid

Forty-six gm of the methyl ester produced in Step A were added under a nitrogen atmosphere to a mixture of 500 cc of methanol, 60 cc of 5N aqueous sodium hydroxide and 30 cc of water and the resulting reaction mixture was heated to reflux and held there for 1½ hours. The methanol was removed from the reaction mixture by distillation under reduced pressure and the reaction mixture was diluted with water and then extracted with ethyl ether. The ether extracts were washed with water and the aqueous phase and the wash waters were combined and the resulting aqueous phase was acidified with 2N aqueous hydrochloric acid. The acid aqueous phase was extracted with ether and the ether extracts were washed with aqueous sodium chloride, was dried and concentrated to dryness by distillation under reduced pressure to obtain 38.6 gm of trans 3,3-dimethyl-2-formyl-1-cyclopropanecarboxylic (1R,2R) acid having a boiling point of 115°C at 0.9 mm Hg and a specific rotation $[\alpha]_D^{20} = +38° \pm 3°$ (c = 1 percent in benzene).

Step C: Sodium salt of trans 3,3-dimethyl-2-formyl-1-cyclopropanecarboxylic (1R,2R) acid 2.02 gm of trans 3,3-dimethyl-2-formyl-1-cyclopropanecarboxylic (1R,2R) acid were added to 3 cc of methanol and after adding one drop of an alcoholic solution of phenolphthalein thereto, the reaction mixture was cooled to 0°C and a sufficient amount of a 0.1N methanol solution of sodium hydroxyde was added slowly to turn the phenolphthalein pink. The methanol was distilled off under reduced pressure at temperature below 30°C and benzene was added to the residue. the benzene was distilled off at reduced pressure below 30°C and the said operation was repeated twice more to obtain the sodium salt of trans 3,3-dimethyl-2-formyl-1-cyclopropanecarboxylic (1R,2R) acid in the form of a white powder.

Step D: 3,3-dimethyl-2-(2'-methoxycarbonyl-trans-1'-propenyl)-1-cyclopropanecarboxylic (1R,2R) acid A mixture of 15 cc of methyl propionate, 0.75 gm of a suspension of 50 percent sodium hydride in vaseline oil and 1 drop of anhydrous methanol was heated to reflux under a nitrogen atmosphere and held there for 3 hours. After cooling the reaction mixture, the sodium salt produced in Step C was added in small fractions to the reaction mixture which was then heated to 80°C and held there for 4 hours. The reaction mixture was then cooled to 20°C and excess sodium hydride was decomposed by the addition of moist ethyl ether. The reaction mixture was poured over ice and the aqueous phase was extracted with ethyl ether. The ether extracts were discarded and the aqueous phase was acidified and then extracted with ethyl ether. The ethyl ether extracts were washed with saturated aqueous sodium chloride, dried and concentrated to dryness under reduced pressure to obtain 2.81 gm of an oil.

The 2.81 gm of oil were added to a mixture of 19 cc of ethanol, 4.85 cc of acetic acid and 2.24 gm of reagent T (trimethylaminoacetohydrazide chloride) and the resulting reaction mixture was heated to reflux and held there for 1 hour. After cooling, the reaction mixture was poured into water and 3.24 cc of 10 N aqueous sodium hydroxide were added thereto. The aqueous alkaline phase was extracted with ethyl ether and the ether extracts were washed with water, dried and concentrated to dryness to obtain 1.95 gm of an oil.

2.8 gm of 1-quinine were dissolved in 19.6 cc of a hot mixture of acetone/water (80–20) and the 1.95 gm of oil obtained above were added thereto. The solution as allowed to slowly cool and the crystals were recovered by suction filtration to obtain 1.97 gm of crude 1-quinine salt of d-trans pyrethric (1R,2R) acid. The said salt was crystallized three times from ethyl acetate to obtain the said salt in a pure state. The lquinine salt was added under stirring to a mixture of aqueous hydrochloric acid and ether to acidify the salt and the aqueous phase was separated by decantation. The aqueous phase was saturated with sodium chloride and then was extracted with ethyl ether. The ether extracts were washed with a saturated aqueous sodium chloride solution, dried and concentrated to dryness by distillation. Under reduced pressure to obtain 3,3-dimethyl-2-(2'-methoxycarbonyl-trans-1'propenyl)-1-cyclopropane carboxylic (1R,2R) acid or d-trans pyrethric (1R,2R) acid having a specific rotation $[\alpha]_D^{20} = +86°$ (c = 1 percent in carbon tetrachloride.)

EXAMPLE II 2.84 gm of 3,3-dimethyl-2-formyl-1-cyclopropanecarboxylic (1R,2R) acid diluted with 5 cc of methyl propionate were added under a nitrogen atmosphere to a mixture of 10 cc of methyl propionate, 2.3 gm of sodium hydride and one drop of anhydrous methanol cooled to 0°C and the reaction mixture was heated to 80°C and held there for 4 hours. The reaction mixture was cooled and treated as in Step D of Example I. The 1-quinine salt was crystallized four times from ethyl acetate and the resulting pyrethric acid had a specific rotation $[\alpha]_D^{20} = +82.5°$ (C + 1 percent in carbon tetrachloride).

EXAMPLE III

A mixture of 7 cc of methyl propionate, 2.3 gm of sodium hydride and one drop of anhydrous methanol was heated under a nitrogen atmosphere to 80°C and held there for 1 hour. The reaction mixture was cooled to 0°C and 2.84 gm of 3,3-dimethyl-2-formyl-1-cyclopropanecarboxylic (1R,2R) acid diluted with 5 cc of methyl propionate was added dropwise thereto. The reaction mixture was stirred for 1 hour at 20°C and then 3 hours at 80°C and was then treated as in Step D of Example I. After the treatment with reagent T and formation of the quinine salt and recrystallization three times from ethyl acetate, there was obtained pyrethric (1R,2R) acid having a specific rotation $[\alpha]_D^{20} = +85.5°$ (C = 1 percent in carbon tetrachloride).

EXAMPLE IV

A mixture of 0.88 gm of methyl propionate, 8 cc of 1,2-dimethoxyethane, 0.55 gm of sodium hydride and one drop of methanol was heated under a nitrogen atmosphere to 80°C and held there for 1½ hours. The reaction mixture was then cooled to 0°C and the sodium salt of 3,3- dimethyl-2-formyl-1-cyclopropanecarboxylic (1R,2R) acid (prepared as in Step C of Example I starting with 0.71 gm of the free acid) suspended in 4 cc of 1,2-dimethoxyethane was added thereto. The reaction mixture was heated to 80°C and held there for 4 hours and then treated as in Step D of Example I. After treatment with Reagent T, the product was subjected to chromatography over silica gel with elution with an ethyl ether-petroleum ether (boiling point of 35 –70° C) mixture acidified with 0.2 percent formic acid. the product was converted into its quinine salt which was recrystallized from ethyl acetate to obtain pyrethric (1R,2R) acid having a specific rotation $[\alpha]_D^{20} = +84°$ (c = 1 percent in carbon tetrachloride).

Various modifications of the process of the invention may be made without departing from the spirit or scope thereof and it is to be understood that the invention is to be limited only as defined in the appended claims.

We claim:

1. A process for the preparation of d-trans pyrethric acid comprising reacting in an anhydrous medium a member selected from the group consisting of 3,3-dimethyl-2-formyl-1-cyclopropanecarboxylic acid and its alkali metal salts with methyl propionate pretreated with an alkali metal hydride in anhydrous methanol to partially convert it to its anionic form.

2. The process of claim 1 wherein the acid is used in the free acid form.

3. The process of claim 1 wherein the said acid is in the form of an alkali metal salt.

4. The process of claim 1 wherein the reaction is effected in the presence of an excess of methyl propionate.

5. A process for the preparation of d-trans pyrethric (1R,2R) acid comprising reacting in an anhydrous medium the sodium salt of 3,3-dimethyl-2-formyl-1-cyclopropanecarboxylic (1R,2R) acid and methyl propionate pretreated with sodium hydride and anhydrous methanol to partially convert it to its anionic form.

* * * * *